US011878526B2

(12) United States Patent
Tonomura et al.

(10) Patent No.: US 11,878,526 B2
(45) Date of Patent: Jan. 23, 2024

(54) LIQUID EJECTING HEAD AND LIQUID EJECTING APPARATUS

(71) Applicant: SEIKO EPSON CORPORATION, Tokyo (JP)

(72) Inventors: Osamu Tonomura, Ebina (JP); Masao Nakayama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 45 days.

(21) Appl. No.: 17/649,096

(22) Filed: Jan. 27, 2022

(65) Prior Publication Data

US 2022/0242121 A1 Aug. 4, 2022

(30) Foreign Application Priority Data

Jan. 29, 2021 (JP) ................................ 2021-012848

(51) Int. Cl.
*B41J 2/14* (2006.01)

(52) U.S. Cl.
CPC ................................ *B41J 2/14233* (2013.01)

(58) Field of Classification Search
CPC .......... B41J 2/14233; B41J 2002/14241; B41J 2002/14419; B41J 2002/14491; B41J 2/045
See application file for complete search history.

(56) References Cited

U.S. PATENT DOCUMENTS

2017/0217180 A1 8/2017 Nakayama et al.

FOREIGN PATENT DOCUMENTS

JP 2017-139331 A 8/2017

OTHER PUBLICATIONS

Hardness, elastic modulus, and wear resistance of hafnium oxide-based films grown by atomic layer deposition, Maria Berdova; Xuwen Liu; Claudia Wiemer; . . . et al., Aug. 17, 2016, [Introduction, Results and Discussion], retrieved on May 6, 2023 (Year: 2016).*
Material Property Database, Thermal Silicon Oxide, Table List, retrieved on May 26, 2023 (Year: 1996).*
Zirconium Oxide Material Properties, Table List, retrieved on May 6, 2023 (Year: 2023).*

(Continued)

*Primary Examiner* — Lisa Solomon
(74) *Attorney, Agent, or Firm* — WORKMAN NYDEGGER

(57) ABSTRACT

A liquid ejecting head includes a pressure chamber, a vibration plate including a first vibration plate, a second vibration plate, and a third vibration plate, and a piezoelectric actuator, being stacked in this order. A portion where the piezoelectric layer and the third vibration plate are stacked in a first direction on the first vibration plate and the second vibration plate, and a portion where the piezoelectric layer and the third vibration plate are not stacked are provided. One of the first vibration plate and the second vibration plate has a compressive stress and another one of the first vibration plate and the second vibration plate has a tensile stress. A Young's modulus of the third vibration plate is larger than Young's moduli of the first vibration plate and the second vibration plate.

16 Claims, 10 Drawing Sheets

(56) References Cited

OTHER PUBLICATIONS

Analysis and Measurement of Volume Change by Transformation of Crystal Between Hf and HfOx Thin Film During Oxidation Using Nanoindenter, Myung Joon Park, Soo In Kim, and Chang Woo Lee, 2015, [Introduction, Results and Discussion], retrieved on May 6, 2023 (Year: 2015).*

AZO Materials, Properties—Tantalum Oxide Overview, Table List, retrieved on May 6, 2023 (Year: 2023).*

Naito, Nobuhiro et al., Liquid Jet Head and Liquid Jet Apparatus, Jul. 7, 2014, [Embodiment 1 and Other Embodiments, particularly the description of Figure 5, see Figs. 1-3 and 5] (Year: 2014).*

* cited by examiner

LIQUID EJECTING HEAD AND LIQUID EJECTING APPARATUS

The present application is based on, and claims priority from JP Application Serial Number 2021-012848, filed Jan. 29, 2021, the disclosure of which is hereby incorporated by reference herein in its entirety.

BACKGROUND

1. Technical Field

The present disclosure relates to a liquid ejecting head and a liquid ejecting apparatus which eject an ink droplet, or more specifically, to an ink jet printing head and an ink jet printing apparatus which eject an ink as a liquid.

2. Related Art

An ink jet printing head that ejects ink droplets as a liquid is considered as a typical example of a liquid ejecting head. A structure including a flow passage substrate provided with pressure chambers that communicate with nozzles, and piezoelectric actuators provided on one surface side of this flow passage substrate through vibration plates, and configured to eject ink droplets from the nozzles by generating a change in pressure in the ink in each pressure chamber by using the corresponding piezoelectric actuator, for example, has been known as such an ink jet printing head.

The piezoelectric actuator includes a first electrode formed on a vibration plate of a flow passage substrate, a piezoelectric layer formed on the first electrode by using a piezoelectric material that exhibits an electromechanical transduction behavior, and a second electrode provided on the piezoelectric layer (see JP-A-2017-139331, for example).

However, an attempt to reduce a Young's modulus of the vibration plate in order to increase a weight of each ink droplet to be ejected from the nozzle may cause reduction in resonance frequency of the vibration plate, thus leading to a failure to continuously eject the ink droplets at a high speed.

This problem occurs not only in the ink jet printing head but also in liquid ejecting heads for ejecting liquids other than the ink.

SUMMARY

An aspect of the present disclosure to solve the above-described problem is a liquid ejecting head including a pressure chamber, a vibration plate including a first vibration plate, a second vibration plate, and a third vibration plate, and a piezoelectric actuator including a first electrode, a piezoelectric layer, and a second electrode being stacked in this order. A plurality of the pressure chambers are arranged in a first direction in plan view from a stacking direction of the vibration plate and the piezoelectric actuator, a portion where the piezoelectric layer and the third vibration plate are stacked in the first direction on the first vibration plate and the second vibration plate, and a portion where the piezoelectric layer and the third vibration plate are not stacked are provided, one of the first vibration plate and the second vibration plate has a compressive stress and another one of the first vibration plate and the second vibration plate has a tensile stress, and a Young's modulus of the third vibration plate is larger than Young's moduli of the first vibration plate and the second vibration plate.

Another aspect of the present disclosure is a liquid ejecting apparatus including the liquid ejecting head according to the above-described aspect.

DESCRIPTION OF EXEMPLARY EMBODIMENTS

Figure 1:
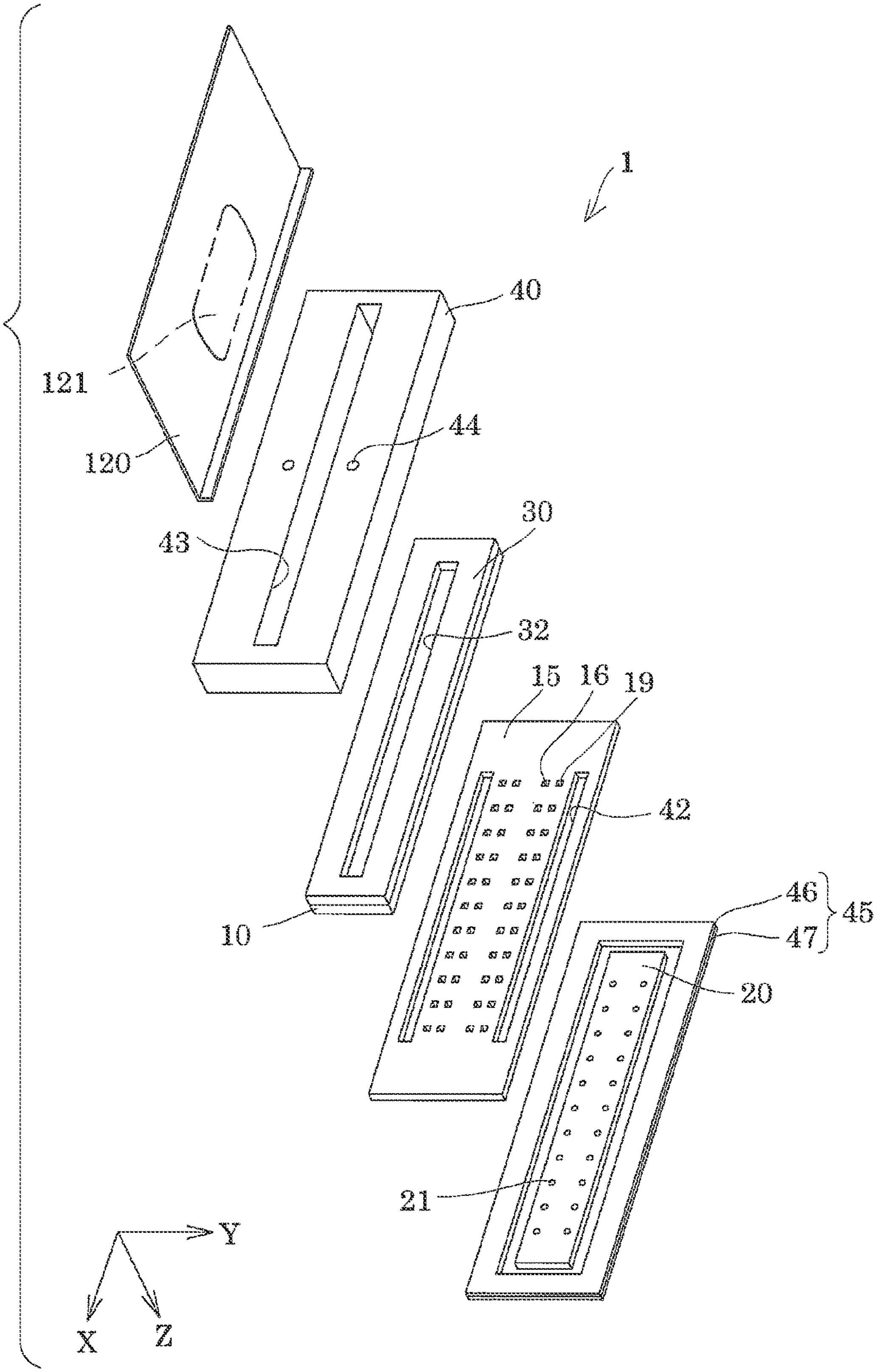
FIG. 1 is an exploded perspective view of a printing head according to Embodiment 1 of the present disclosure.

The present disclosure will be described below in further details based on embodiments. It is to be noted, however, that the following description depicts certain aspects of the present disclosure which can be modified as appropriate within the scope of the present disclosure. In the drawings, the same constituents will be denoted by the same reference signs and overlapping explanations thereof will be omitted as appropriate. In the drawings, signs x, y, and z represent three spatial axes that are orthogonal to one another. In this specification, directions along these axes will be defined as x direction, y direction, and z direction, respectively. In the drawings, each direction indicated with an arrow will be explained as a positive (+) direction while an opposite direction to the direction indicated with the arrow will be explained as a negative (−) direction. The three of x, y, and z spatial axes not restricted to the positive directions or the negative directions will be explained as the x axis, the y axis, and the z axis, respectively. In the meantime, the z direction indicates a vertical direction. Here, the +z direction indicates a vertically downward direction while the −z direction represents a vertically upward direction.

Embodiment 1

Figure 2:
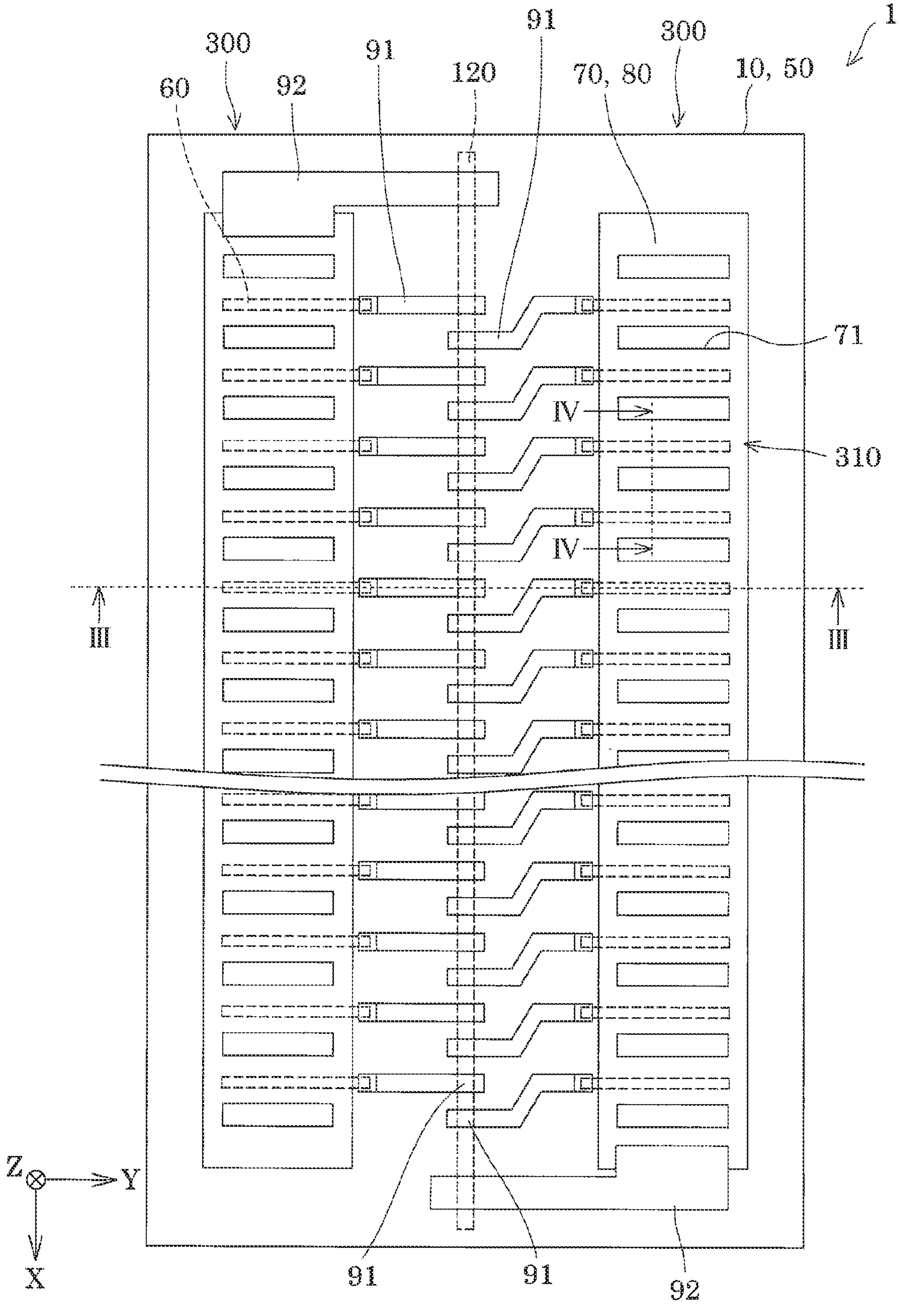
FIG. 2 is a plan view of the printing head according to the Embodiment 1 of the present disclosure.
Figure 3:
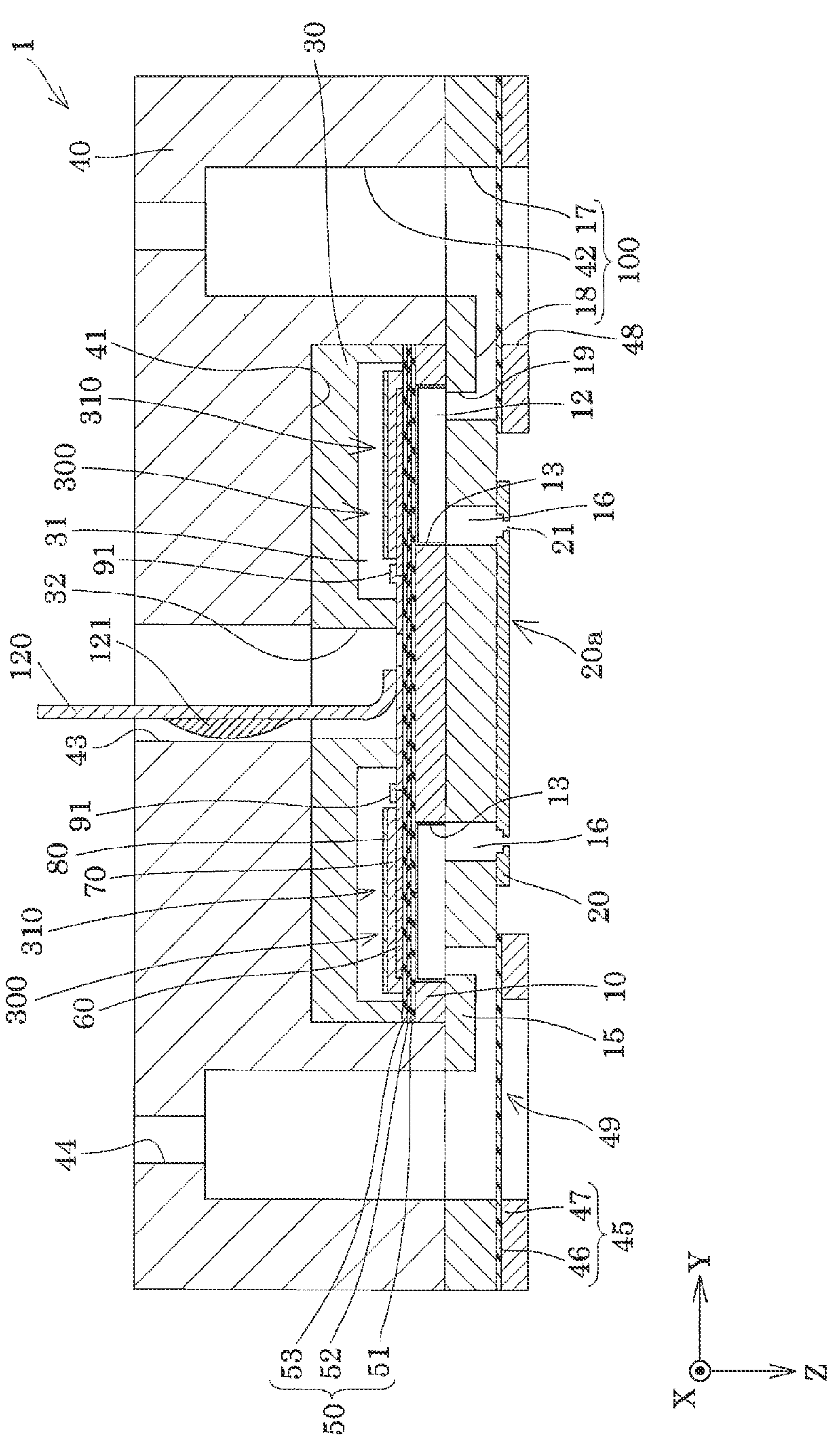
FIG. 3 is a cross-sectional view of the printing head according to the Embodiment 1 of the present disclosure.
Figure 4:
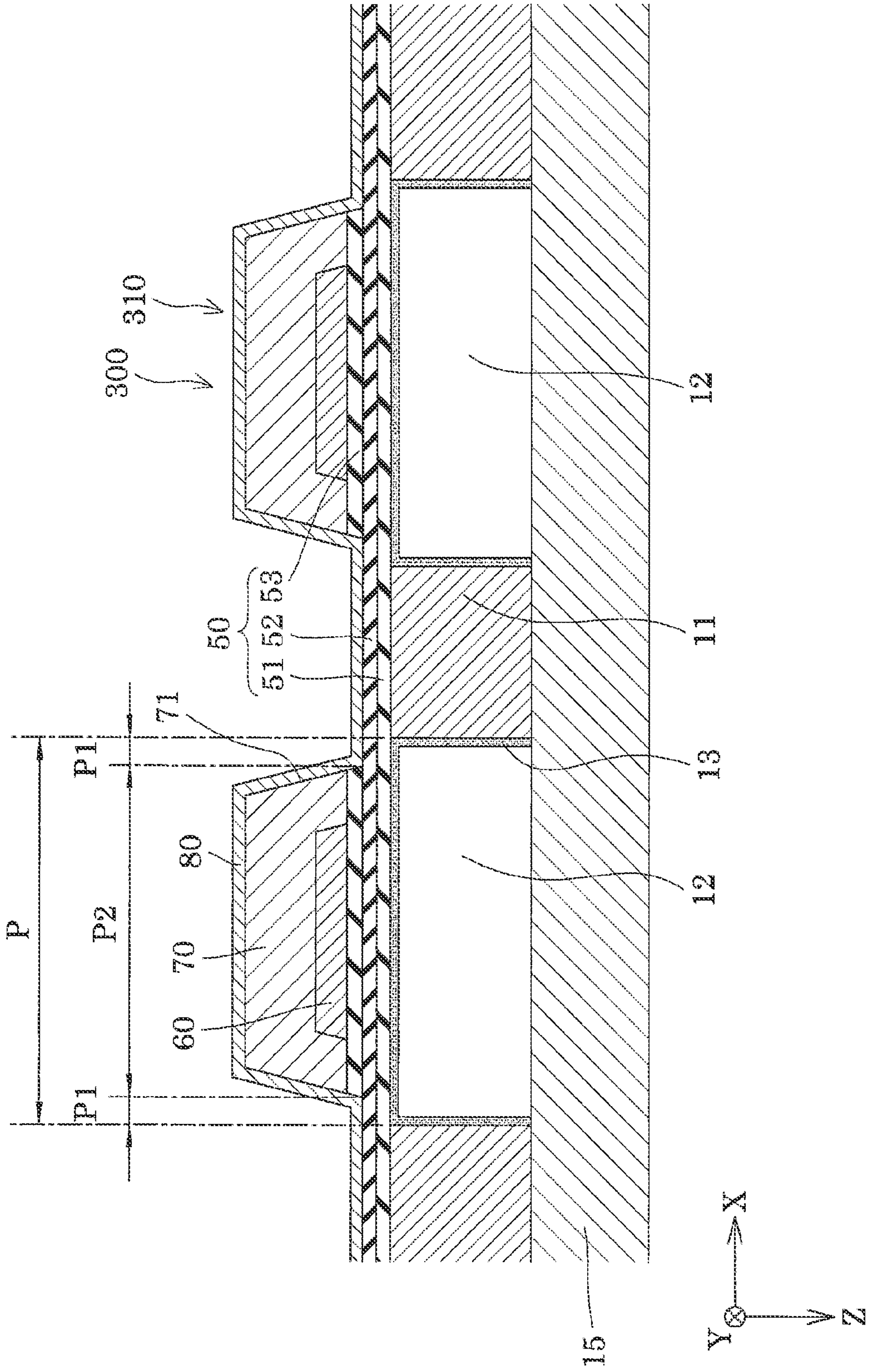
FIG. 4 is a cross-sectional view of a principal part of the printing head according to the Embodiment 1 of the present disclosure.
Figure 5:
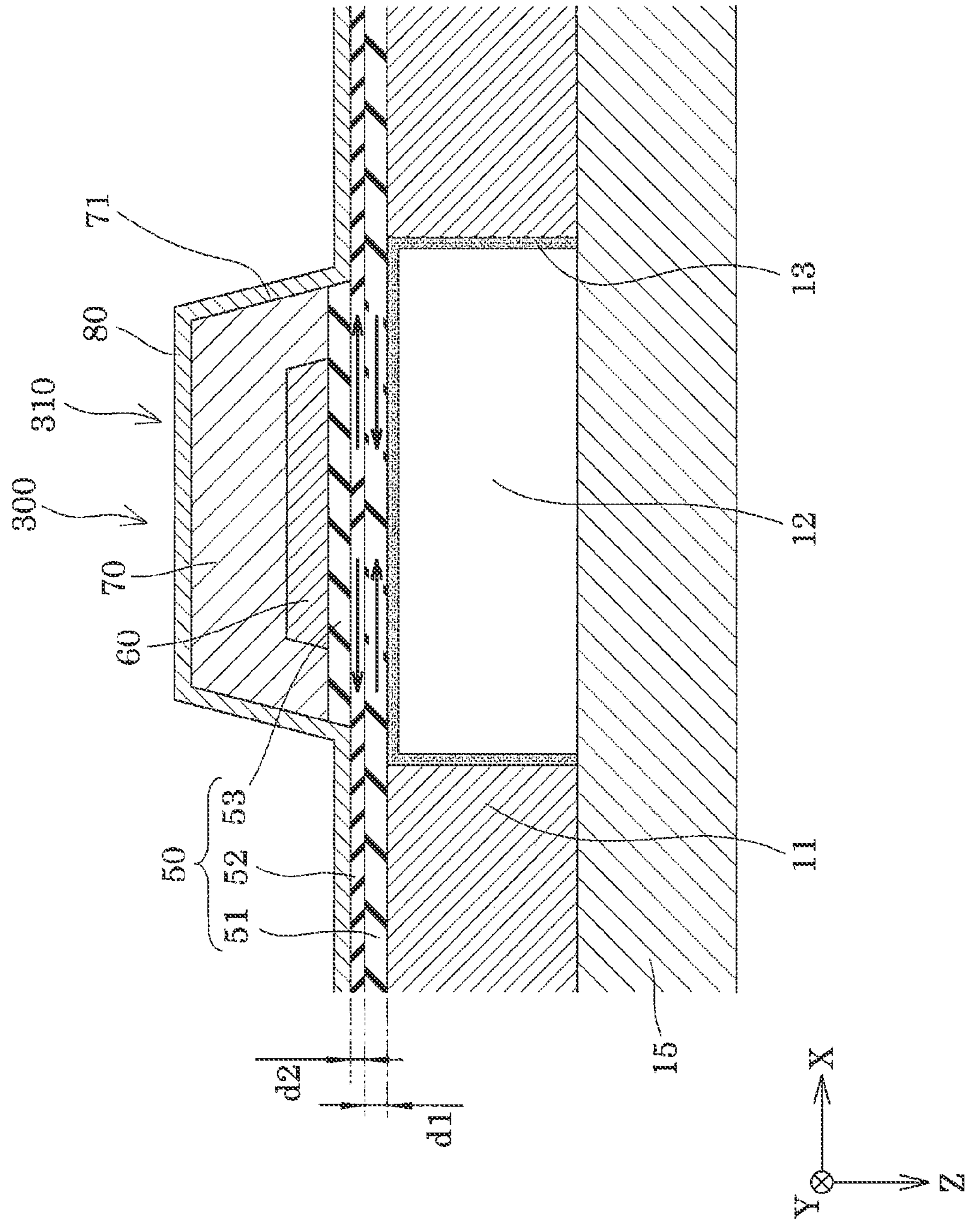
FIG. 5 is another cross-sectional view of the principal part of the printing head according to the Embodiment 1 of the present disclosure.
Figure 6:
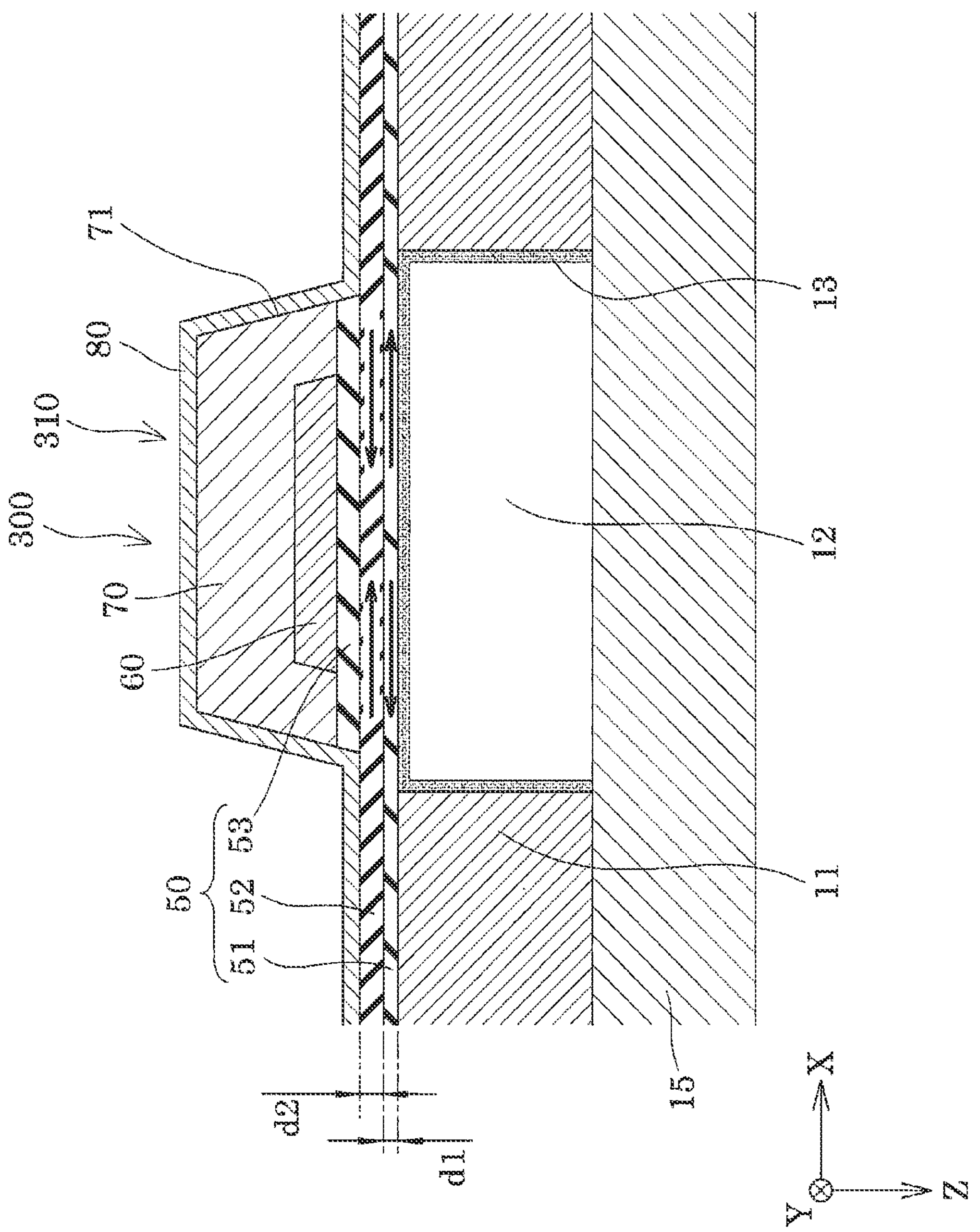
FIG. 6 is still another cross-sectional view of the principal part of the printing head according to the Embodiment 1 of the present disclosure.

FIG. 1 is an exploded perspective view of an ink jet printing head representing an example of a liquid ejecting head according to Embodiment 1 of the present disclosure. FIG. 2 is a plan view of the printing head. FIG. 3 is a cross-sectional view taken along the III-III line in FIG. 2. FIG. 4 is a cross-sectional view taken along the IV-IV line in FIG. 2. FIGS. 5 and 6 are cross-sectional views for explaining internal stresses of a vibration plate.

As illustrated in the drawings, an ink jet printing head 1 (hereinafter also simply referred to as a printing head 1) representing the example of the liquid ejecting head of this embodiment includes a flow passage forming substrate 10 as an example of a "substrate". The flow passage forming substrate 10 is made of any of a silicon substrate, a glass substrate, an SOI substrate, and various ceramic substrates. The flow passage forming substrate 10 of this embodiment is made of single crystalline silicon. Here, the flow passage forming substrate 10 may be a substrate having a (100) plane as a preferential orientation plane or a substrate having a (110) plane as the preferential orientation plane.

In the flow passage forming substrate 10, pressure chambers 12 are arranged along the +x direction being a "first direction". In other words, the "first direction" is a "direction of arrangement" of the pressure chambers 12, which is the +x direction in this embodiment. The pressure chambers 12 are disposed on a straight line that extends along the +x direction in such a way as to be located at the same position in the +y direction. Two pressure chambers 12 that are adjacent to each other in the +x direction are partitioned by a partition wall 11. Of course, the layout of the pressure chambers 12 is not limited to the above-mentioned layout. For example, the layout of the pressure chambers 12 in arrangement in the +x direction may adopt a so-called staggered layout in which every other pressure chamber 12 is located at a position shifted in the +y direction.

Each pressure chamber 12 of this embodiment has an elongate shape, which is long in a direction intersecting with the +x direction being the direction of arrangement in plan view that is viewed in the +z direction. Specifically, the pressure chamber 12 has such a shape that the +x direction being the direction of arrangement is a short direction while the direction intersecting with the +x direction, which is the +y direction in this embodiment, is a long direction in plan view in the +z direction. In the meantime, the pressure chamber 12 of this embodiment has a rectangular shape in which the +y direction is a long direction in plan view that is viewed in the +z direction. Of course, the shape of the pressure chamber 12 in plan view in the +z direction is not limited only to the foregoing. The pressure chamber 12 may have any of a parallelogram shape, a so-called rounded rectangular shape (also referred to as a race track shape) that is based on a rectangular shape with its two ends in a long direction being formed into a semicircular shape, an oval shape such as an elliptic shape and an egg shape, a circular shape, a polygonal shape, and the like. By arranging the pressure chambers 12 in the +x direction while aligning the short direction thereof with the +x direction when viewed in the +z direction, it is possible to densely arrange the pressure chambers 12 in the flow passage forming substrate 10. These pressure chambers 12 correspond to "recesses" provided in the "substrate".

An inner wall surface of each pressure chamber 12 in the above-described flow passage forming substrate 10 is provided with a flow passage protection film 13 having liquid resistance, or in other words, ink resistance. The ink resistance mentioned above corresponds to etching resistance against an alkaline ink. The flow passage protection film 13 can adopt a single layer or laminated layers of at least one material selected from tantalum oxides ($TaO_x$), zirconium oxides ($ZrO_x$), nickel (Ni), and chromium (Cr), for example. Alternatively, a resin may be used as the flow passage protection film 13. In this embodiment, tantalum pentoxide ($Ta_2O_5$) is used as the flow passage protection film 13.

A communicating plate 15 and a nozzle plate 20 are stacked in sequence on the +z direction side of the flow passage forming substrate 10.

The communicating plate 15 is provided with nozzle communication passages 16, each of which establishes communication between the pressure chamber 12 and a nozzle 21.

The communicating plate 15 is provided with a first manifold portion 17 and a second manifold portion 18, which constitute part of a manifold 100 that serves as a common liquid chamber that communicates with the pressure chambers 12 in common. The first manifold portion 17 is provided penetrating the communicating plate 15 in the +z direction. The second manifold portion 18 is provided to be open to a surface on the +z direction side of the communicating plate 15 without penetrating the communicating plate 15 in the +z direction.

Furthermore, the communicating plate 15 is provided with supply communication passages 19 each communicating with an end portion on the y axis of the corresponding pressure chamber 12. The respective supply communication passages 19 are provided independently of one another so as to correspond to the respective pressure chambers 12. Each of the supply communication passages 19 establishes communication between the second manifold portion 18 and each pressure chamber 12, thereby supplying the ink in the manifold 100 to each pressure chamber 12.

Any of a silicon substrate, a glass substrate, an SOI substrate, various ceramic substrates, a metallic substrate such as a stainless steel substrate, and the like can be used for the communicating plate 15. Here, the communicating plate 15 may adopt a material having substantially the same thermal expansion coefficient as that of the flow passage forming substrate 10. By using the materials having substantially the same thermal expansion coefficient for the flow passage forming substrate 10 and the communicating plate 15, respectively, it is possible to reduce the occurrence of warpage along with heat application due to a difference in thermal expansion coefficient.

The nozzle plate 20 is provided at the communicating plate 15 on an opposite side of the flow passage forming substrate 10, or in other words, at a surface on the +z direction side.

The nozzle plate 20 is provided with the nozzles 21 that communicate with the respective pressure chambers 12 through the nozzle communication passages 16. In this embodiment, nozzle rows in which the nozzles 21 arranged in a line along the +x direction are provided in two rows away from each other in the +y direction. In other words, the nozzles 21 in each row are arranged at the same position in the +y direction. Of course, the layout of the nozzles 21 is not limited to this layout. For example, the layout of the pressure chambers 12 arranged in the +x direction may adopt a so-called staggered layout in which every other nozzle 21 is located at a position shifted in the +y direction. Any of a silicon substrate, a glass substrate, an SOI substrate, various ceramic substrates, a metallic substrate such as a stainless steel substrate, and an organic substance such as polyimide can be used for the nozzle plate 20. Here, the nozzle plate 20 may adopt a material having substantially the same thermal expansion coefficient as that of the communicating plate 15. By using the materials having substantially the same thermal expansion coefficient for the nozzle plate 20 and the communicating plate 15, respectively, it is possible to reduce the occurrence of warpage along with heat application due to a difference in thermal expansion coefficient.

A case member 40 is fixed to a surface on the −z direction side of the communicating plate 15. The case member 40 is provided with third manifold portions 42 that communicate with the first manifold portion 17. The first manifold portion 17 and the second manifold portion 18 provided to the communicating plate 15 and the third manifold portions 42 provided to the case member 40 collectively constitute the manifold 100 of this embodiment. The manifold 100 is continuously provided in the +x direction being the direction of arrangement of the pressure chambers 12, and the supply communication passages 19 that establish communication between the respective pressure chambers 12 and the manifold 100 are arranged in the +x direction. In the meantime, the case member 40 is provided with inlet ports 44 that communicate with the manifold 100 for supplying the ink to the manifold 100. The case member 40 is provided with a coupling port 43 configured to communicate with a through hole 32 in a protection substrate 30 to be described later in detail and into which a wiring substrate 120 is inserted.

A compliance substrate 45 is provided at the surface on the +z direction side of the communicating plate 15 where the first manifold portion 17 and the second manifold portion 18 are open. This compliance substrate 45 seals openings on the +z direction side of the first manifold portion 17 and the second manifold portion 18. The above-mentioned compliance substrate 45 includes a sealing film 46 formed from a flexible thin film, and a fixation substrate 47 formed from a hard material such as a metal. A region of the fixation substrate 47 opposed to the manifold 100 is formed into an opening 48 by removing the material completely in a thickness direction. Accordingly, a surface on one side of the manifold 100 serves as a compliance unit 49 which is a flexible portion sealed solely with the flexible sealing film 46. This compliance unit 49 is flexurally deformed so as to absorb a change in pressure of the ink in the manifold 100.

A vibration plate 50 and a piezoelectric actuator 300 that includes a first electrode 60, a piezoelectric layer 70, and a second electrode 80 are stacked in sequence on the surface on the −z direction side of the flow passage forming substrate 10. That is to say, the pressure chamber 12, the vibration plate 50, the first electrode 60, the piezoelectric layer 70, and the second electrode 80 are arranged in this order in the −z direction.

The vibration plate 50 includes a first vibration plate 51, a second vibration plate 52, and a third vibration plate 53. The first vibration plate 51, the second vibration plate 52, and the third vibration plate 53 are stacked in this order in the −z direction.

The first vibration plate 51 is provided at the surface on the −z direction side of the flow passage forming substrate 10, which is provided continuously across the entire surface on the −z direction side of the flow passage forming substrate 10. Specifically, the first vibration plate 51 is in contact with the partition walls 11 of the flow passage forming substrate 10 made of single crystalline silicon. In other words, the first vibration plate 51 is provided directly on the surface on the −z direction side of the flow passage forming substrate 10. In this embodiment, the first vibration plate 51 is provided across the enter surface on the −z direction side of the flow passage forming substrate 10.

The second vibration plate 52 is provided at a surface on the −z direction side of the first vibration plate 51. The second vibration plate 52 is continuously provided across the enter surface on the −z direction side of the first vibration plate 51.

The third vibration plate 53 is provided at a surface on the −z direction side of the second vibration plate 52. The third vibration plate 53 is provided partially in the +x direction, which is a direction of arrangement of the pressure chambers 12 as well as the short direction, at a portion overlapping the pressure chambers 12 in plan view in the +z direction. That is to say, in the vibration plate 50, there is a portion where the first vibration plate 51, the second vibration plate 52, and the third vibration plate 53 are stacked in the +x direction and a portion where the first vibration plate 51 and the second vibration plate 52 are stacked without provision of the third vibration plate 53. A region of the vibration plate 50 opposed to each pressure chamber 12 will be referred to as a flexible region P in this embodiment. Of the flexible region P, each region located inside of a wall surface being an end portion in the +x direction of the pressure chamber 12 without including a central part of the pressure chamber 12, when viewed in the +z direction, will be referred to as a rim portion P1. Of the flexible region P, a portion other than the rim portions P1 will be referred to as a central portion P2. Hence, the first vibration plate 51, the second vibration plate 52, and the third vibration plate 53 are stacked at the central portion P2 in this embodiment. On the other hand, the third vibration plate 53 is not provided at each rim portion P1, and the first vibration plate 51 and the second vibration plate 52 are stacked there. In other words, the third vibration plate 53 is provided only at the central portion P2 in the +x direction, which is the direction of arrangement of the pressure chambers 12 as well as the short direction, in a region opposed to the pressure chamber 12 in the +z direction. In the meantime, the third vibration plate 53 is not provided at the two end portions in the direction along the x axis in the region opposed to the pressure chamber 12 in the +z direction, that is, at the rim portions P1 being the end portion on the +x direction side and the portion on the −x direction side, where only the first vibration plate 51 and the second vibration plate 52 are stacked.

Young's moduli s1 and s2 of the first vibration plate 51 and the second vibration plate 52 are smaller than a Young's modulus s3 of the third vibration plate 53. In other words, these Young's moduli satisfy relations of $s1<s3$ and $s2<s3$. Here, at least one of the first vibration plate 51 and the second vibration plate 52 contains a silicon oxide or silicon. Here, the expression "the first vibration plate 51 or the second vibration plate 52 contains a silicon oxide or silicon" means that the first vibration plate 51 or the second vibration plate 52 may also contain other materials as long as the relevant vibration plate contains the silicon oxide or silicon as its main component. The expression "the main component of the first vibration plate 51 or the second vibration plate 52 contains the silicon oxide or silicon as the main component" means that any of the silicon oxide or silicon contained in the first vibration plate 51 or the second vibration plate 52 is equal to or above 50% by mass. The first vibration plate 51 or the second vibration plate 52 that contains the silicon oxide or silicon as mentioned above is usually amorphous. The first vibration plate 51 or the second vibration plate 52 is typically made of silicon dioxide ($SiO_2$).

Flow passages such as the pressure chambers 12 of this embodiment are formed by subjecting the flow passage forming substrate 10 to anisotropic etching from the surface on the +z direction side, and a surface on the −z direction side of each pressure chamber 12 is defined by the first vibration plate 51. In other words, by providing the first vibration plate 51 that contains the silicon oxide as part of the vibration plate 50 on the flow passage forming substrate 10 side, the first vibration plate 51 can be used as an etching stop layer when subjecting the flow passage forming substrate 10 to the anisotropic etching from the surface on the opposite side of the vibration plate 50 by using an alkaline solution such as KOH. Accordingly, it is possible to form the pressure chambers 12 at high density and high accuracy in the flow passage forming substrate 10 by the anisotropic etching, and to suppress development of unevenness in thickness of the vibration plate 50. Of course, the method of forming the pressure chambers 12 is not limited only to the anisotropic etching, and the method may adopt dry etching and the like. The material of the first vibration plate 51 is not limited only to the silicon oxide. For example, part of the flow passage forming substrate 10 may be used as the first vibration plate 51. Specifically, any of the silicon substrate, the glass substrate, the SOI substrate, and the various ceramic substrates may be used as the first vibration plate 51. In the meantime, any of zirconium oxides ($ZrO_x$) such as zirconium dioxide ($ZrO_2$), silicon nitride ($Si_3N_4$), titanium oxides ($TiO_x$), aluminum oxide ($Al_2O_3$), hafnium oxides ($HfO_x$), magnesium oxide (MgO), and lanthanum aluminate ($LaAlO_3$) may be used as the first vibration plate 51, for example. Alternatively, an organic film such as polyimide and parylene may be used as the first vibration plate 51. The first vibration plate 51 is not limited only to an amorphous substance and may be a substance having a preferentially oriented crystalline structure such as single crystalline silicon. The second vibration plate 52 is similar to the first vibration plate 51. That is, at least one of the first vibration plate 51 and the second vibration plate 52 may be amorphous. By adopting the amorphous substance as any of the first vibration plate 51 and the second vibration plate 52 as described above, it is possible to make the first vibration plate 51 or the second vibration plate 52 easily deformable and chip-proof.

In the meantime, the first vibration plate 51 may be formed from a thermally oxidized film. Specifically, when the partition walls 11 of the flow passage forming substrate 10 in contact with the first vibration plate 51 are made of single crystalline silicon and the first vibration plate 51 is formed from the thermally oxidized film, it is possible to improve adhesion of each partition walls 11 to the first vibration plate 51.

One of the first vibration plate 51 and the second vibration plate 52 described above has a compressive stress while the other one has a tensile stress. Specifically, there are a case where the first vibration plate 51 has the compressive stress and the second vibration plate 52 has the tensile stress as illustrated in FIG. 5 and a case where the first vibration plate 51 has the tensile stress and the second vibration plate 52 has the compressive stress as illustrated in FIG. 6. Here, the expression "one of the first vibration plate 51 and the second vibration plate 52 has the compressive stress" means that its internal stress is equivalent to the compressive stress. Likewise, the expression "one of the first vibration plate 51 and the second vibration plate 52 has the tensile stress" means that its internal stress is equivalent to the tensile stress.

When the first vibration plate 51 has the compressive stress and the second vibration plate 52 has the tensile stress as illustrated in FIG. 5, a thickness d1 of the first vibration plate 51 along the z axis may be larger than a thickness d2 of the second vibration plate 52 (d1>d2). In general, a film having a compressive stress is more deformable than a film having a tensile stress. Accordingly, it is possible to increase the displacement of the vibration plate 50 by setting the thickness d1 of the first vibration plate 51 having the compressive stress larger than the thickness d2 of the second vibration plate 52 having the tensile stress.

On the other hand, when the first vibration plate 51 has the tensile stress and the second vibration plate 52 has the compressive stress as illustrated in FIG. 6, the thickness d2 of the second vibration plate 52 may be larger than the thickness d1 of the first vibration plate 51 (d2>d1). That is to say, it is possible to increase the displacement of the vibration plate 50 by setting the thickness d2 of the second vibration plate 52 having the compressive stress larger than the thickness d1 of the first vibration plate 51 having the tensile stress.

Incidentally, the configuration in which the first vibration plate 51 has the compressive stress and the second vibration plate 52 has the tensile stress as illustrated in FIG. 5 renders the vibration plate 50 more deformable in such a way as to protrude in the +z direction being the pressure chamber 12 side, thus bringing about a larger amount of deformation as compared to the configuration illustrated in FIG. 6. Accordingly, it is possible to increase the weight of each ink droplet to be ejected from the nozzle 21 and to increase a flying speed of the ink droplet.

The configuration in which the first vibration plate 51 has the tensile stress and the second vibration plate 52 has the compressive stress as illustrated in FIG. 6 renders the vibration plate 50 more deformable in such a way as to protrude in the −z direction being the opposite side to the pressure chamber 12, thus bringing about a larger amount of deformation. Accordingly, it is possible to tear off a meniscus easily.

Here, as mentioned above, the Young's modulus s3 of the third vibration plate 53 is larger than the Young's moduli s1 and s2 of the first vibration plate 51 and the second vibration plate 52. In other words, the relations s3>s1 and s3>s2 are satisfied. In this way, it is possible to increase a Young's modulus of the vibration plate 50 as a whole and to suppress reduction in resonance frequency of the vibration plate 50. Incidentally, when the vibration plate 50 is provided only with the first vibration plate 51 and the second vibration plate 52 without providing the third vibration plate 53, the amount of displacement of the vibration plate 50 can be increased but the Young's modulus of the vibration plate 50 as a whole is reduced, thus leading to reduction in resonance frequency. In this embodiment, it is possible to suppress reduction in resonance frequency while enhancing the amount of displacement of the vibration plate 50 by providing the third vibration plate 53 that has the higher Young's modulus than the Young's moduli of the first vibration plate 51 and the second vibration plate 52 partially in the region opposed to the pressure chamber 12.

The above-described third vibration plate 53 may adopt a material also functioning as an anti-diffusion layer that suppresses diffusion of the components of the piezoelectric layer 70 to the second vibration plate 52 and the first vibration plate 51 as well as to the flow passage forming substrate 10 side. Examples of the material of the third vibration plate 53 include an oxide containing zirconium, a nitride containing silicon, an oxynitride containing silicon, and the like. In this embodiment, zirconium dioxide ($ZrO_2$) is used as the oxide containing zirconium. Here, the expression "the third vibration plate 53 being formed from any of an oxide containing zirconium, a nitride containing silicon, and an oxynitride containing silicon" means that the third vibration plate 53 may also contain other materials as long as the third vibration plate 53 contains any of the oxide containing zirconium, the nitride containing silicon, and the oxynitride containing silicon as its main component. The expression "the main component of the third vibration plate 53 is any of the oxide containing zirconium, the nitride containing silicon, and the oxynitride containing silicon" means that any of the oxide containing zirconium, the nitride containing silicon, and the oxynitride containing silicon is included in the third vibration plate 53 in an amount equal to or above 50% by mass. In this embodiment, zirconium dioxide ($ZrO_2$) is used for the third vibration plate 53. Provision of the third vibration plate 53 containing zirconium oxide as mentioned above can suppress diffusion of the components included in the piezoelectric layer 70 such as lead (Pb) and bismuth (Bi) to a portion below the third vibration plate 53, that is, to the first vibration plate 51, the second vibration plate 52, and the flow passage forming substrate 10. As a consequence, provision of the third vibration plate 53 containing zirconium oxide can suppress a defect such as reduction in rigidity attributed to the diffusion of the components included in the piezoelectric layer 70 to any of the first vibration plate 51, the second vibration plate 52, and the flow passage forming substrate 10. Provision of the third vibration plate 53 containing zirconium oxide can suppress diffusion of the components contained in the first vibration plate 51, the second vibration plate 52, the flow passage forming substrate 10, and the like, which are provided on the +z direction side relative to the third vibration plate 53, to the piezoelectric layer 70 side.

In the meantime, the third vibration plate 53 may adopt an insulative material. By forming the third vibration plate 53 from the insulative material, it is possible to suppress a short-circuit between the first electrodes 60 to be provided, respectively, to active portions 310 to be described later in detail by way of the third vibration plate 53. Incidentally, even when the first electrode 60 is formed as a common electrode to the active portions 310, the third vibration plate 53 may apply an electric field to the piezoelectric layer 70 through a portion other than the first electrode 60 if the third vibration plate 53 has conductivity. Accordingly, the third vibration plate 53 may be formed from the insulating material in this regard as well.

The piezoelectric actuator 300 configured to generate a change in pressure of the ink inside the pressure chamber 12 by flexurally deforming the vibration plate 50 is provided at a surface on the −z direction side of the above-described vibration plate 50. The piezoelectric actuator 300 includes the first electrode 60, the piezoelectric layer 70, and the second electrode 80, which are stacked in sequence from the +z direction side being the vibration plate 50 side to the −z direction side. The piezoelectric actuator 300 serves as a pressure generation unit that generates the change in pressure of the ink inside the pressure chamber 12. This piezoelectric actuator 300 is also referred to as a piezoelectric element, which corresponds to a portion including the first electrode 60, the piezoelectric layer 70, and the second electrode 80. A portion that causes a piezoelectric strain in the piezoelectric layer 70 when a voltage is applied between the first electrode 60 and the second electrode 80 will be referred to as an active portion 310. On the other hand, a portion that does not cause the piezoelectric strain in the piezoelectric layer 70 will be referred to as a non-active portion. In other words, the active portion 310 corresponds to a portion where the piezoelectric layer 70 is sandwiched between the first electrode 60 and the second electrode 80. In this embodiment, the active portion 310 is formed for each pressure chamber 12 that is the recess. In other words, the piezoelectric actuator 300 is provided with multiple active portions 310. In general, one of electrodes in the active portion 310 constitutes an individual electrode which is independently provided for each active portion 310, while the other electrode therein constitutes a common electrode which is common to the active portions 310. In this embodiment, the first electrode 60 constitutes the individual electrode while the second electrode 80 constitutes the common electrode. Of course, the first electrode 60 may constitute the common electrode and the second electrode 80 may constitute the individual electrode. Of this piezoelectric actuator 300, a portion opposed to the pressure chamber 12 along the z axis serves as a flexible portion while a portion located outside of the pressure chamber 12 serves as a non-flexible portion.

To be more precise, the first electrodes 60 are cut out for the respective pressure chambers 12 and constitute the individual electrodes independently provided to the respective active portions 310 as illustrated in FIGS. 2 and 3. Each first electrode 60 is formed into a width narrower than a width of the pressure chamber 12 in the +x direction. In other words, an end portion in the +x direction of the first electrode 60 is located inside of the region opposed to the pressure chamber 12. As illustrated in FIG. 3, an end portion of the first electrode 60 on the nozzle 21 side along the y axis is located outside of the pressure chamber 12. An individual lead electrode 91 being an outgoing line is coupled to this end portion of the first electrode 60 located outside of the pressure chamber 12 along the y axis.

The above-described first electrode 60 is made of a conductive material, examples of which include iridium (Ir), platinum (Pt), palladium (Pd), gold (Au), nickel (Ni), chromium (Cr), nickel-chrome (NiCr), tungsten (W), titanium (Ti), titanium oxides ($TiO_x$), tungsten titanium (TiW), and the like.

As illustrated in FIGS. 2 to 4, the piezoelectric layer 70 is continuously provided in the +x direction while setting its width in the +y direction to a predetermined width. The width in the +y direction of the piezoelectric layer 70 is larger than a length of the pressure chamber 12 in the +y direction being a long direction thereof. Accordingly, on two sides in the +y direction and the −y direction of the pressure chamber 12, the piezoelectric layer 70 extends to the outside of the region opposed to the pressure chamber 12. An end on the y axis of the above-described piezoelectric layer 70 located on the opposite side of the nozzle 21 is located outside of an end portion of the first electrode 60. In other words, the end portion of the first electrode 60 on the opposite side of the nozzle 21 is covered with the piezoelectric layer 70. An end portion of the piezoelectric layer 70 on the nozzle 21 side is located inside of the end portion of the first electrode 60, and the end portion of the first electrode 60 on the nozzle 21 side is not covered with the piezoelectric layer 70. Here, the individual lead electrode 91 made of gold (Au) or the like as mentioned above is coupled to the end portion of the first electrode 60 that extends to the outside of the piezoelectric layer 70.

Recesses 71 corresponding to the respective partition walls 11 are formed in the piezoelectric layer 70. A width in the +x direction of each recess 71 is larger than a width of the partition wall 11. The recess 71 is provided penetrating the piezoelectric layer 70 and the third vibration plate 53 in the +z direction being a thickness direction. Specifically, a width in the +x direction of the piezoelectric layer 70 is provided at the same width as that of the third vibration plate 53, and the width in the +x direction of the third vibration plate 53 is defined by the recess 71. In other words, the central portion P2 where the first vibration plate 51, the second vibration plate 52, and the third vibration plate 53 are stacked on the vibration plate 50 and the rim portions P1 where the first vibration plate 51 and the second vibration plate 52 are stacked without stacking the third vibration plate 53 are formed by setting the width in the +x direction of the recess 71 larger than the width of the partition wall 11. By providing the recess 71 as described above, it is possible to reduce rigidity of the portions of the vibration plate 50 opposed to the end portions in the +x direction and the −x direction of the pressure chamber 12, or so-called arm portions of the vibration plate 50. As a consequence, the piezoelectric actuator 300 can be displaced appropriately. As described above, the piezoelectric layer 70 is provided only at the central portion P2 of the vibration plate 50 where the third vibration plate 53 is formed, and is not provided at the rim portion P1 where the third vibration plate 53 is not formed. Accordingly, it is possible to suppress diffusion of the components of the piezoelectric layer 70 to the second vibration plate 52, the first vibration plate 51, and the flow passage forming substrate 10 even when the third vibration plate 53 is not provided at each rim portion P1.

A Young's modulus of the flow passage protection film 13 provided on the inner wall of the pressure chamber 12 as described above may be smaller than the Young's modulus of the third vibration plate 53. In this embodiment, the Young's modulus of tantalum pentoxide used for the flow passage protection film 13 is about 130 GPa while the Young's modulus of zirconium dioxide used for the third vibration plate 53 is about 210 GPa. By setting the Young's modulus of the flow passage protection film 13 smaller than the Young's modulus of the third vibration plate 53 as described above, it is possible to suppress reduction in displacement of the vibration plate 50.

The above-described piezoelectric layer 70 is formed by using a piezoelectric material containing a composite oxide of a perovskite structure represented by a general formula $ABO_3$. In this embodiment, lead zirconate titanate (PZT; $Pb(Zr,Ti)O_3$) is used as the piezoelectric material. The piezoelectric layer 70 having a relatively large piezoelectric constant d31 is obtained by using PZT as the piezoelectric material.

In the composite oxide of the perovskite structure represented by the general formula $ABO_3$, 12 oxygen atoms are coordinated at the A sites and 6 oxygen atoms are coordinated at the B sites, thereby forming an octahedron. In this embodiment, lead (Pb) atoms are located at the A sites and zirconium (Zr) atoms and titanium (Ti) atoms are located at the B sites.

The piezoelectric material is not limited to PZT mentioned above. Other elements may be included in the A sites or the B sites. For example, the piezoelectric material may be any of perovskite materials including barium zirconate titanate ($Ba(Zr,Ti)O_3$), lead lanthanum zirconate titanate ($(Pb,La)(Zr,Ti)O_3$), lead magnesium niobate zirconium titanate ($Pb(Zr,Ti)(Mg,Nb)O_3$), and lead niobate zirconate titanate ($Pb(Zr,Ti,Nb)O_3$) containing silicon.

In addition thereto, the piezoelectric material may be a material in which the content of Pb is reduced or so-called a low-lead material, or a material not containing Pb or so-called a lead-free material. The use of the low-lead material as the piezoelectric material makes it possible to reduce an amount of use of Pb. The use of the lead-free material makes it possible to eliminate the use of Pb. Hence, an environmental load can be reduced by the use of the low-lead material or the lead-free material as the piezoelectric material.

Examples of the lead-free piezoelectric material include BFO-based materials containing bismuth ferrite (BFO; $BiFeO_3$). In BFO, bismuth (Bi) atoms are located at the A sites and iron (Fe) atoms are located at the B sites. Other elements may be added to BFO. For example, at least one element selected from manganese (Mn), aluminum (Al), lanthanum (La), barium (Ba), titanium (Ti), cobalt (Co), cerium (Ce), samarium (Sm), chromium (Cr), potassium (K), lithium (Li), calcium (Ca), strontium (Sr), vanadium (V), niobium (Nb), tantalum (Ta), molybdenum (Mo), tungsten (W), nickel (Ni), zinc (Zn), praseodymium (Pr), neodymium (Nd), and europium (Eu) may be added to BFO.

Other examples of the lead-free piezoelectric material include KNN-based materials containing sodium potassium niobate (KNN; $KNaNbO_3$). Other elements may be added to KNN. For example, at least one element selected from manganese (Mn), lithium (Li), barium (Ba), calcium (Ca), strontium (Sr), zirconium (Zr), titanium (Ti), bismuth (Bi), tantalum (Ta), antimony (Sb), iron (Fe), cobalt (Co), silver (Ag), magnesium (Mg), zinc (Zn), copper (Cu), vanadium (V), chromium (Cr), molybdenum (Mo), tungsten (W), nickel (Ni), aluminum (Al), silicon (Si), lanthanum (La), cerium (Ce), praseodymium (Pr), neodymium (Nd), promethium (Pm), samarium (Sm), and europium (Eu) may be added to KNN.

A material having a composition in which the elements are partially deleted, a material having a composition in which some of the elements are excessively contained, or a material having a composition in which the elements are partially replaced by other elements is also applicable to the piezoelectric material. These materials of which compositions deviate from a stoichiometric composition due to the deletion or the excess, or due to the partial replacement of the elements by other elements is also included in the piezoelectric material according to this embodiment as long as the basic characteristics of the piezoelectric layer 70 are not altered. Of course, the piezoelectric material applicable to this embodiment is not limited only to the above-mentioned materials containing Pb, Bi, Na, K, and the like.

As illustrated in FIGS. 2 to 4, the second electrode 80 is continuously provided on the −z direction side of the piezoelectric layer 70, which is the opposite side of the first electrode 60, and constitutes the common electrode that is common to the active portions 310. The second electrode 80 is provided continuously across the +x direction while setting a width in the +y direction to a predetermined width. This second electrode 80 is also provided on an inner surface of the recess 71, that is, on each side surface of the recess 71 of the piezoelectric layer 70 and on the second vibration plate 52 constituting the bottom surface of the recess 71. Of course, the second electrode 80 may be provided on only part of the inner surface of the recess 71 instead of being provided on the entire inner surface of the recess 71.

The individual lead electrode 91 serving as the outgoing line is drawn out of each first electrode 60. On the other hand, a common lead electrode 92 serving as another outgoing line is drawn out of the second electrode 80. The flexible wiring substrate 120 is coupled to an end portion of each of the individual lead electrodes 91 and the common lead electrode 92 on an opposite side of the end portion coupled to the piezoelectric actuator 300. A driving circuit 121 provided with a switching element for driving the piezoelectric actuator 300 is mounted on the wiring substrate 120.

As illustrated in FIGS. 1 and 3, the protection substrate 30 having substantially the same size as the flow passage forming substrate 10 is attached to a surface on the −z direction side of the flow passage forming substrate 10 provided with the above-described piezoelectric actuators 300. The protection substrate 30 includes holding portions 31 which are spaces for protecting the piezoelectric actuators 300. The holding portions 31 are independently provided for the respective rows of the piezoelectric actuators 300 arranged in the +x direction, and two holding portions 31 are formed to be juxtaposed in the +y axis direction. The protection substrate 30 is provided with the through hole 32, which is located between the two holding portions 31 juxtaposed in the +y direction and is formed in such a way as to penetrate the protection substrate 30 in the +z direction. The end portions of the individual lead electrodes 91 and the common lead electrodes 92 drawn out of the electrodes of the piezoelectric actuators 300 extend in such a way as to be exposed inside this through hole 32, and the individual lead electrodes 91 and the common lead electrodes 92 are coupled to the wiring substrate 120 inside the through hole 32.

As illustrated in FIG. 3, the case member 40 that defines the manifold 100, which communicates with the pressure chambers 12, in conjunction with the flow passage forming substrate 10 is fixed onto the protection substrate 30. The case member 40 has substantially the same shape as the above-described communicating plate 15 in plan view, and is joined to the protection substrate 30 and also joined to the above-described communicating plate 15. In this embodiment, the case member 40 is joined to the communicating plate 15. Although it is not illustrated, the case member 40 is also joined to the protection substrate 30.

The above-mentioned case member 40 includes a recess 41 provided on the protection substrate 30 side and having a sufficient depth for housing the flow passage forming substrate 10 and the protection substrate 30. This recess 41 has an opening area that is larger than an area of a surface of the protection substrate 30 joined to the flow passage forming substrate 10. An opening surface on the nozzle plate 20 side of the recess 41 is sealed by the communicating plate 15 in a state where the flow passage forming substrate 10 and the like are housed in the recess 41. Thus, a third manifold portion 42 is defined by the case member 40 and the flow passage forming substrate 10 at an outer peripheral portion of the flow passage forming substrate 10. The manifold 100 is formed from the first manifold portion 17 and the second manifold portion 18 provided to the communicating plate 15, and the third manifold portion 42 defined by the case member 40 and the flow passage forming substrate 10. The manifold 100 is provided continuously across the +x direction, which is the direction of arrangement of the pressure chambers 12, and the supply communication passages 19 to establish communication between the respective pressure chambers 12 and the manifold 100 are arranged in the +x direction.

The compliance substrate 45 is provided at the surface on the +z side of the communicating plate 15 where the first manifold portion 17 and the second manifold portion 18 are open. This compliance substrate 45 seals the openings on a liquid ejecting surface 20*a* side of the first manifold portion 17 and the second manifold portion 18. In this embodiment, the above-described compliance substrate 45 includes the sealing film 46 formed from the flexible thin film, and the fixation substrate 47 formed from the hard material such as a metal. The region of the fixation substrate 47 opposed to the manifold 100 is formed into the opening 48 by removing the material completely in the thickness direction. Accordingly, the surface on one side of the manifold 100 serves as the compliance unit 49 which is sealed solely with the flexible sealing film 46.

As described above, the ink jet printing head 1 being an example of the liquid ejecting head of the present disclosure includes the pressure chamber 12, the vibration plate 50 including the first vibration plate 51, the second vibration plate 52, and the third vibration plate 53, and the piezoelectric actuator 300 including the first electrode 60, the piezoelectric layer 70, and the second electrode 80 are stacked in this order. In the ink jet printing head 1, the pressure chambers 12 are arranged in the +x direction being the first direction in plan view in the +z direction being a stacking direction. The ink jet printing head 1 is provided with the central portion P2 being the portion where the piezoelectric layer 70 and the third vibration plate 53 are stacked on the first vibration plate 51 and the second vibration plate 52 in the +x direction, and the rim portion P1 being the portion piezoelectric layer 70 and the third vibration plate 53 are not stacked. In the ink jet printing head 1, one of the first vibration plate 51 and the second vibration plate 52 has the compressive stress and the other one of the first vibration plate 51 and the second vibration plate 52 has the tensile stress. In the ink jet printing head 1, the Young's modulus of the third vibration plate 53 is larger than the Young's moduli of the first vibration plate 51 and the second vibration plate 52.

As described above, by proving the vibration plate 50 with the central portion P2 where the first vibration plate 51, the second vibration plate 52, and the third vibration plate 53 are stacked and the rim portion P1 where the third vibration plate 53 is not stacked, it is possible to improve the amount of displacement of the vibration plate 50, that is, to obtain large displacement with a relatively small voltage. In particular, by setting the Young's modulus of the third vibration plate 53 larger than the Young's moduli of the first vibration plate 51 and the second vibration plate 52, it is possible to improve the amount of displacement at the portion of the vibration plate 50 not provided with the third vibration plate 53, and thus to increase the weight of each ink droplet and to improve the flying speed of the ink droplet.

Since one of the first vibration plate 51 and the second vibration plate 52 has the compressive stress and the other one of the first vibration plate 51 and the second vibration plate 52 has the tensile stress, a stress balance can be achieved at the portion of the vibration plate 50 not provided with the third vibration plate 53. Accordingly, it is possible to suppress destruction of the vibration plate 50 at the time of the displacement of the vibration plate 50.

By providing the vibration plate 50 with the third vibration plate 53 having the Young's modulus larger than the Young's moduli of the first vibration plate 51 and the second vibration plate 52, it is possible to improve the resonance frequency of the vibration plate 50, thereby improving a drive frequency and conducting continuous ejection of the ink droplets in a short time. In general, the amount of displacement and the resonance frequency have a trade-off relation. Accordingly, the resonance frequency is smaller when a material having the small Young's modulus is used in order to increase the amount of displacement of the vibration plate 50. On the other hand, the amount of displacement of the vibration plate 50 is smaller when a material having the large Young's modulus is used in order to increase the resonance frequency of the vibration plate 50. Hence, it is necessary to apply a large voltage to the piezoelectric actuator 300 in order to deal with reduction in weight of the ejected ink droplet or to displace the vibration plate 50. In this embodiment, it is possible to increase the amount of displacement of the vibration plate 50 and to increase the resonance frequency at the same time by providing the portion where the third vibration plate 53 is formed and the portion where the third vibration plate 53 is not formed.

In the ink jet printing head 1 of this embodiment, the portion where the piezoelectric layer 70 and the third vibration plate 53 are not stacked may be the rim portions P1 being the portions corresponding to the two end portions in the +x direction being the first direction of the pressure chamber 12. In this way, it is possible to displace the piezoelectric actuator 300 appropriately by reducing the rigidity of the portions of the vibration plate 50 opposed to the two end portions in the +x direction and the −x direction of the pressure chamber 12, or so-called the arm portions of the vibration plate 50.

In the meantime, in the ink jet printing head 1 of this embodiment, the first vibration plate 51 may be formed from the thermally oxidized film while each partition wall 11 partitioning the pressure chambers 12 may be formed from single crystalline silicon, and the first vibration plate 51 may be in contact with the partition wall 11. By forming the first vibration plate 51 in contact with the partition wall 11 made of single crystalline silicon as described above, it is possible to improve adhesion of the partition wall 11 to the first vibration plate 51 and to suppress the occurrence of a failure such as detachment.

In the meantime, in the ink jet printing head 1 of this embodiment, the flow passage protection film 13 may be formed on the inner wall of the pressure chamber 12 and the Young's modulus of the flow passage protection film 13 may be smaller than the Young's modulus of the third vibration plate 53. By setting the Young's modulus of the flow passage protection film 13 smaller than the Young's modulus of the third vibration plate 53 as described above, it is possible to suppress significant deterioration in displacement of the vibration plate 50 owing to the flow passage protection film 13.

In the ink jet printing head 1 of this embodiment, the piezoelectric layer 70 may contain lead, the third vibration plate 53 may be formed from one of an oxide containing zirconium, a nitride containing silicon, and an oxynitride containing silicon, and at least one of the first vibration plate 51 and the second vibration plate 52 may contain a silicon oxide or silicon. The provision of the third vibration plate 53 including the oxide containing zirconium, the nitride containing silicon, or the oxynitride containing silicon between the piezoelectric layer 70 and the second vibration plate 52 can suppress diffusion of lead contained in the piezoelectric layer 70 to the second vibration plate 52 side beyond the third vibration plate 53. In the meantime, the rim portion P1, which is the portion where the third vibration plate 53 formed, is not provided with the piezoelectric layer 70 either. Accordingly, it is possible to suppress the diffusion of lead contained in the piezoelectric layer 70 to the second vibration plate 52 and the first vibration plate 51.

In the ink jet printing head 1 of this embodiment, at least one of the first vibration plate 51 and the second vibration plate 52 may be amorphous. By adopting the amorphous substance as one of the first vibration plate 51 and the second vibration plate 52, it is possible to make the vibration plate 50 easily deformable and chip-proof.

In the meantime, in the ink jet printing head 1 of this embodiment, the first vibration plate 51 may have the compressive stress and the second vibration plate 52 may have the tensile stress. When the first vibration plate 51 has the compressive stress and the second vibration plate 52 has the tensile stress as mentioned above, the vibration plate 50 is more deformable in such a way as to protrude to the pressure chamber 12 side, so that the amount of deformation can be made relatively larger. Accordingly, it is possible to increase the weight of the ink droplet to be ejected from the nozzle 21 and to increase the flying speed of the ink droplet.

In the ink jet printing head 1 of this embodiment, the thickness d1 of the first vibration plate 51 may be larger than the thickness d2 of the second vibration plate 52. This is due to the following reason. In general, a film having a compressive stress is more deformable than a film having a tensile stress. Accordingly, it is possible to increase the displacement of the vibration plate 50 by setting the thickness d1 of the first vibration plate 51 having the compressive stress larger than the thickness d2 of the second vibration plate 52 having the tensile stress.

In the meantime, in the ink jet printing head 1 of this embodiment, the first vibration plate 51 may have the tensile stress and the second vibration plate 52 may have the compressive stress. When the first vibration plate 51 has the tensile stress and the second vibration plate 52 has the compressive stress as mentioned above, the vibration plate 50 is more deformable in such a way as to protrude in the −z direction being the opposite side of the pressure chamber 12 side, so that the amount of deformation can be made relatively larger. Accordingly, it is possible to tear the ink droplet ejected from the nozzle 21 off the meniscus easily.

In the ink jet printing head 1 of this embodiment, the thickness d2 of the second vibration plate 52 may be larger than the thickness d1 of the first vibration plate 51. This is due to the following reason. In general, a film having a compressive stress is more deformable than a film having a tensile stress. Accordingly, it is possible to increase the displacement of the vibration plate 50 by setting the thickness d2 of the second vibration plate 52 having the compressive stress larger than the thickness d1 of the first vibration plate 51 having the tensile stress.

Embodiment 2

Figure 7:
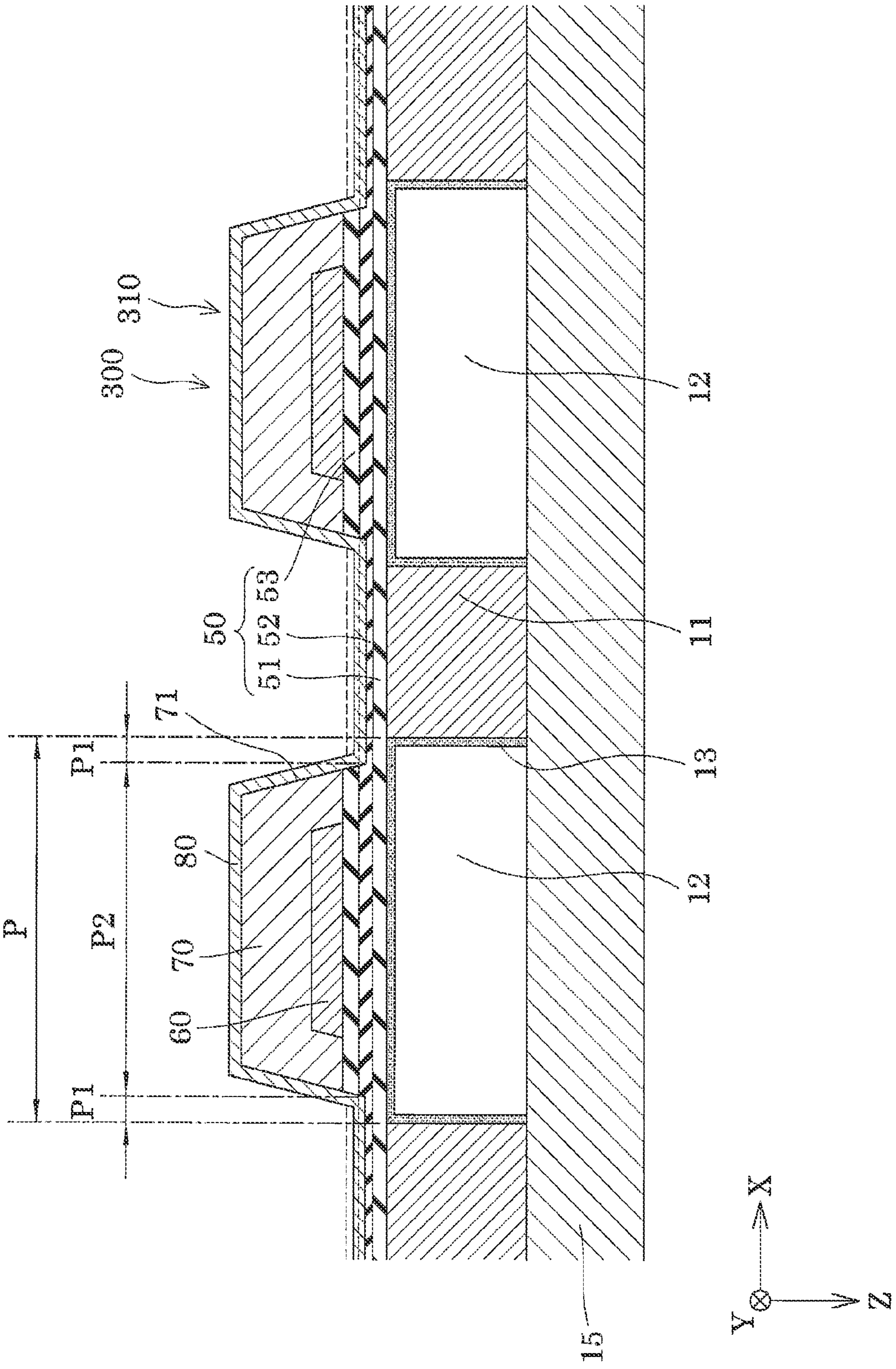
FIG. 7 is a cross-sectional view of a principal part of a printing head according to Embodiment 2 of the present disclosure.

FIG. 7 is a cross-sectional view of a principal part of an ink jet printing head representing an example of a liquid ejecting head according to Embodiment 2 of the present disclosure. The same constituents as those in the above-described embodiment will be denoted by the same reference signs and overlapping explanations thereof will be omitted.

As illustrated in FIG. 7, the recess 71 is formed into such a depth that reaches an intermediate portion in the +z direction being the thickness direction of the second vibration plate 52. Specifically, the second vibration plate 52 is formed in such a way as to partially remain at a bottom surface in the +z direction of the recess 71. In other words, the first vibration plate 51 and a portion in the thickness direction of the second vibration plate 52 are formed at the bottom surface of the recess 71.

The above-described recess 71 and the vibration plate 50 can be formed, for example, by overetching and thus removing part of the second vibration plate 52 simultaneously with the formation of the piezoelectric layer 70 and the third vibration plate 53 by etching.

As with the above-described Embodiment 1, this configuration can also improve the amount of displacement of the vibration plate 50, or in other words, obtain large displacement with a relatively small voltage, by providing the vibration plate 50 with the central portion P2 where the first vibration plate 51, the second vibration plate 52, and the third vibration plate 53 are stacked and the rim portions P1 without stacking the third vibration plate 53. In particular, by setting the Young's modulus of the third vibration plate 53 larger than the Young's moduli of the first vibration plate 51 and the second vibration plate 52, it is possible to improve the amount of displacement at the portion of the vibration plate 50 not provided with the third vibration plate 53, thereby increasing the weight of the ink droplet and improving the flying speed of the ink droplet.

Since one of the first vibration plate 51 and the second vibration plate 52 has the compressive stress and the other one of the first vibration plate 51 and the second vibration plate 52 has the tensile stress, a stress balance can be achieved at the portion of the vibration plate 50 not provided with the third vibration plate 53. Accordingly, it is possible to suppress destruction of the vibration plate 50 at the time of the displacement of the vibration plate 50.

By providing the vibration plate 50 with the third vibration plate 53 having the Young's modulus larger than the Young's moduli of the first vibration plate 51 and the second vibration plate 52, it is possible to improve the resonance frequency of the vibration plate 50, thereby improving the drive frequency and conducting continuous ejection of the ink droplets in a short time. In general, the amount of displacement and the resonance frequency have a trade-off relation. Accordingly, the resonance frequency is smaller when a material having the small Young's modulus is used in order to increase the amount of displacement of the vibration plate 50. On the other hand, the amount of displacement of the vibration plate 50 is smaller when a material having the large Young's modulus is used in order to increase the resonance frequency of the vibration plate 50. Hence, it is necessary to apply a large voltage to the piezoelectric actuator 300 in order to deal with reduction in weight of the ejected ink droplet or to displace the vibration plate 50. In this embodiment, it is possible to increase the amount of displacement of the vibration plate 50 and to increase the resonance frequency at the same time by providing the portion where the third vibration plate 53 is formed and the portion where the third vibration plate 53 is not formed.

In the ink jet printing head 1 of this embodiment, at least one of the first vibration plate 51 and the second vibration plate 52 is reduced in thickness at the rim portion P1 where the piezoelectric layer 70 and the third vibration plate 53 are not stacked as compared to the central portion P2 where the piezoelectric layer 70 and the third vibration plate 53 are stacked.

As described above, it is possible to further improve the amount of displacement of the vibration plate 50 by reducing the thickness of at least one of the first vibration plate 51 and the second vibration plate 52 at the rim portion P1 being the portion where the third vibration plate 53 and the piezoelectric layer 70 are not stacked. In this embodiment, the thickness of the second vibration plate 52 is reduced at the rim portion P1. However, without limitation to the foregoing, the thickness of the first vibration plate 51 at the rim portion P1 may be reduced instead as compared to that at the central portion P2.

Embodiment 3

Figure 8:
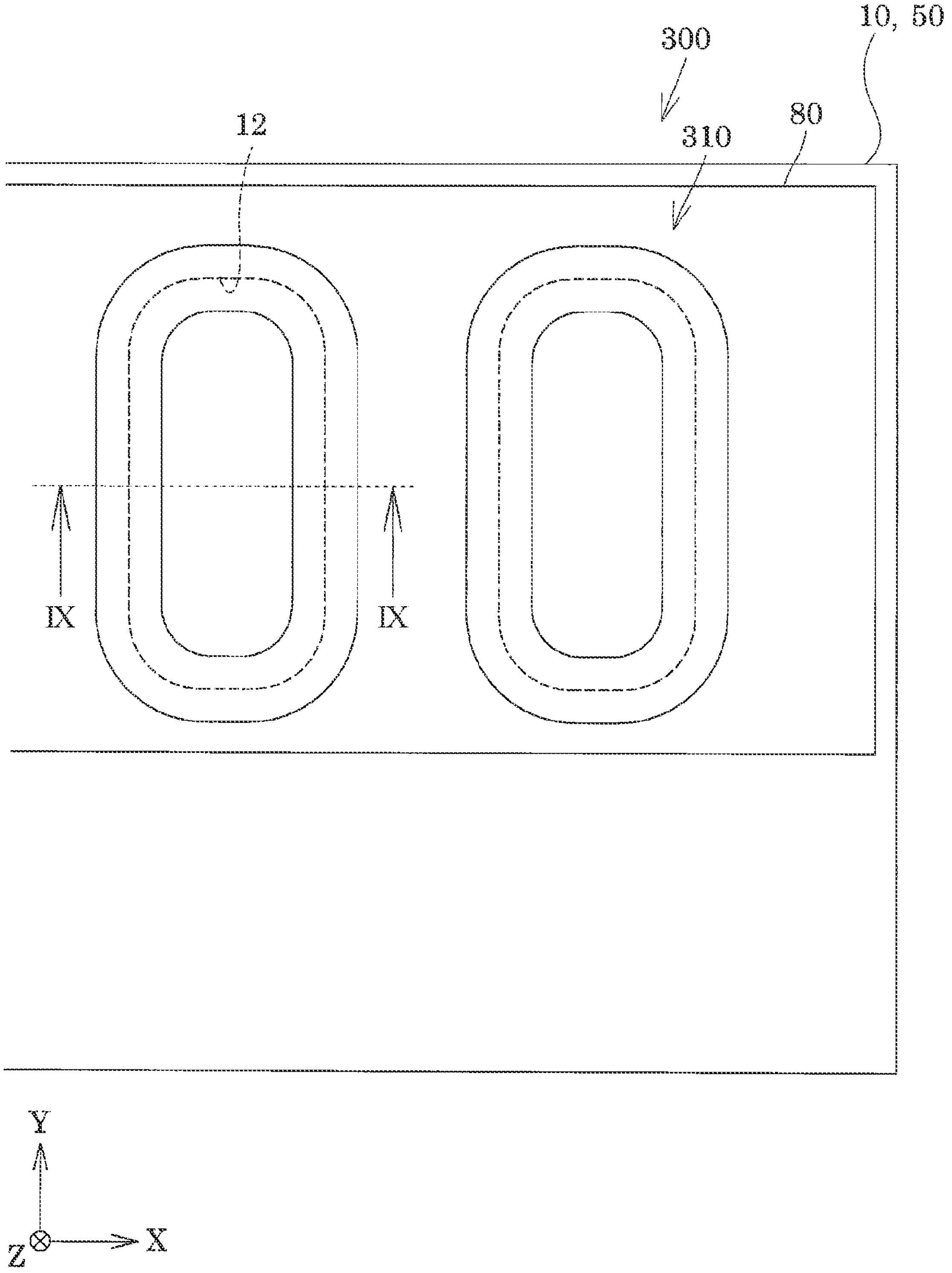
FIG. 8 is a plan view of a principal part of a printing head according to Embodiment 3 of the present disclosure.
Figure 9:
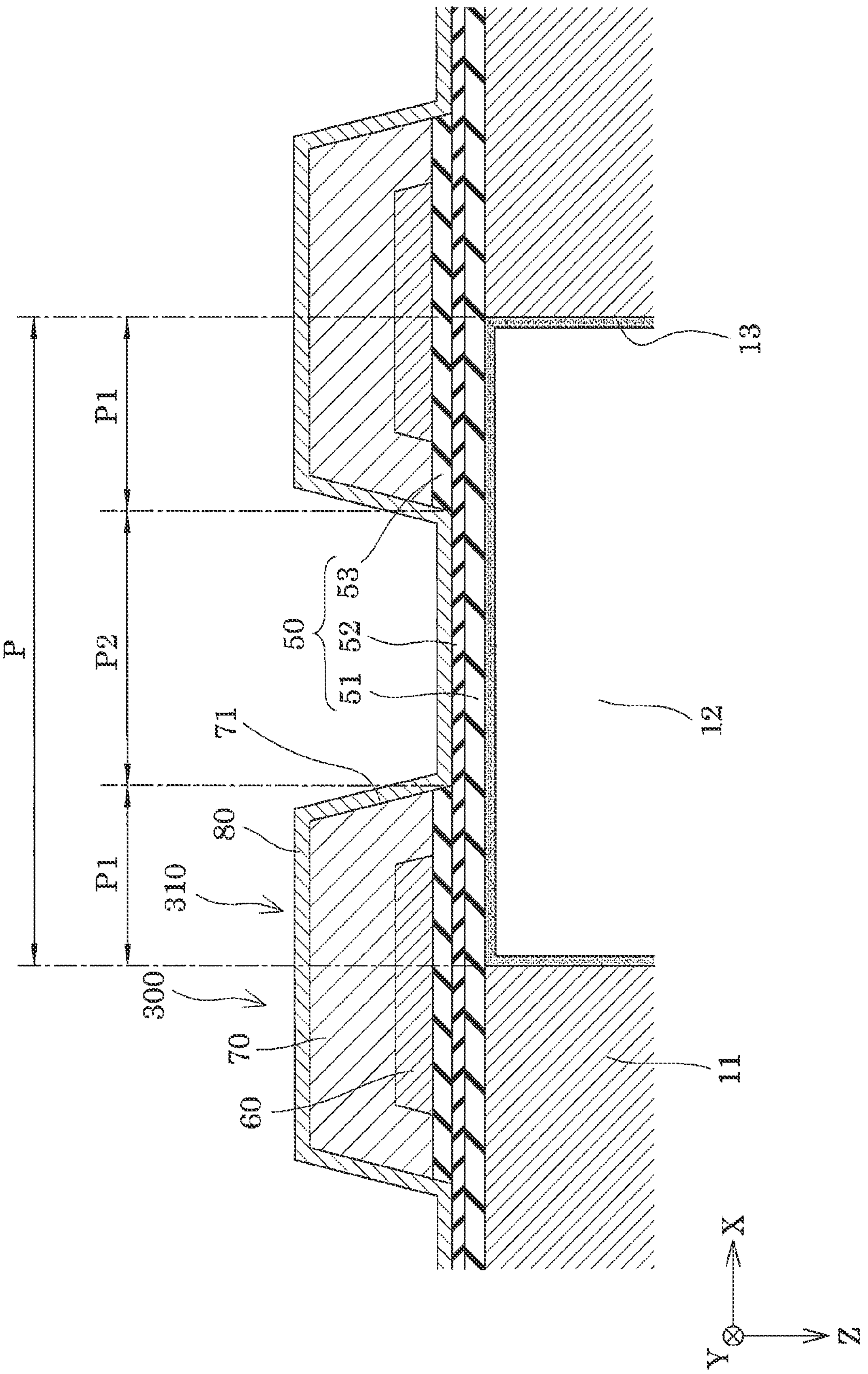
FIG. 9 is a cross-sectional view of the principal part of the printing head according to the Embodiment 3 of the present disclosure.

FIG. 8 is a plan view of a principal part of an ink jet printing head representing an example of a liquid ejecting head according to Embodiment 3 of the present disclosure. FIG. 9 is a cross-sectional view taken along the IX-IX line in FIG. 8. The same constituents as those in the above-described embodiments will be denoted by the same reference signs and overlapping explanations thereof will be omitted.

As illustrated in FIG. 8, the pressure chambers 12 are arranged along the x direction in the flow passage forming substrate 10. A shape of each pressure chamber 12 viewed in the +z direction, that is, an opening shape in the +z direction thereof is formed into a so-called rounded rectangular shape (also referred to as a race track shape), which is based on a rectangular shape having its long direction extending along the +y direction with its two ends in the long direction being formed into a semicircular shape. In other words, in view of the +z direction, the pressure chamber 12 has the elongate shape in which the +y direction is set to a long direction while the +x direction is set to a short direction. Of course, the shape of the pressure chamber 12 viewed in the +z direction is not limited to a particular shape as with the above-described Embodiment 1.

The vibration plate 50 and the piezoelectric actuator 300 are formed at a surface in the −z direction side of the flow passage forming substrate 10.

In the vibration plate 50, the first vibration plate 51, the second vibration plate 52, and the third vibration plate 53 are stacked in this order in the −z direction.

The active portion 310 of the piezoelectric actuator 300 is provided at the rim portion P1 in the flexible region P of the vibration plate 50. The active portion 310 is provided to extend to the outside of the rim portion P1, that is, to the outside of the pressure chamber 12. The active portion 310 is not provided at the central portion P2.

The third vibration plate 53 and the piezoelectric layer 70 are provided in the region where the active portion 310 is provided, that is, at the rim portion P1 and the portion outside of the rim portion P1, or in other words, at the portion located outside of the pressure chamber 12. On the other hand, the third vibration plate 53 and the piezoelectric layer 70 are not provided at the central portion P2. In other words, the central portion P2 is the region where the third vibration plate 53 and the piezoelectric layer 70 are not formed.

As with the above-described embodiments, this configuration can also improve the amount of displacement of the vibration plate 50, or in other words, obtain large displacement with a relatively small voltage by providing the vibration plate 50 with the rim portion P1 where the first vibration plate 51, the second vibration plate 52, and the third vibration plate 53 are stacked and the central portion P2 without stacking the third vibration plate 53. In particular, by setting the Young's modulus of the third vibration plate 53 larger than the Young's moduli of the first vibration plate 51 and the second vibration plate 52, it is possible to improve the amount of displacement at the central portion P2 being the portion of the vibration plate 50 not provided with the third vibration plate 53, thereby increasing the weight of the ink droplet and improving the flying speed of the ink droplet.

Since one of the first vibration plate 51 and the second vibration plate 52 has the compressive stress and the other one of the first vibration plate 51 and the second vibration plate 52 has the tensile stress, a stress balance can be achieved at the portion of the vibration plate 50 not provided with the third vibration plate 53. Accordingly, it is possible to suppress destruction of the vibration plate 50 at the time of the displacement of the vibration plate 50.

By providing the vibration plate 50 with the third vibration plate 53 having the Young's modulus larger than the Young's moduli of the first vibration plate 51 and the second vibration plate 52, it is possible to improve the resonance frequency of the vibration plate 50, thereby improving the drive frequency and conducting continuous ejection of the ink droplets in a short time. In general, the amount of displacement and the resonance frequency have a trade-off relation. Accordingly, the resonance frequency is smaller when a material having the small Young's modulus is used in order to increase the amount of displacement of the vibration plate 50. On the other hand, the amount of displacement of the vibration plate 50 is smaller when a material having the large Young's modulus is used in order to increase the resonance frequency of the vibration plate 50. Hence, it is necessary to apply a large voltage to the piezoelectric actuator 300 in order to deal with reduction in weight of the ejected ink droplet or to displace the vibration plate 50. In this embodiment, it is possible to increase the amount of displacement of the vibration plate 50 and to increase the resonance frequency at the same time by providing the portion where the third vibration plate 53 is formed and the portion where the third vibration plate 53 is not formed.

In the ink jet printing head 1 of this embodiment, the portion where the piezoelectric layer 70 and the third vibration plate 53 are not stacked is the central portion P2, which is a portion corresponding to the center of the pressure chamber 12 in the +x direction being the first direction.

Other Embodiments

The embodiments of the present disclosure have been described above. However, the basic configuration of the present disclosure is not limited only to the above-described embodiments.

For example, in the above-described Embodiment 1, the first electrode 60 constitutes the individual electrode independently provided for each active portion 310 while the second electrode 80 constitutes the common electrode which is common to the active portions 310. However, the configuration of the present disclosure is not limited only to the foregoing.

In the above-described embodiments, the portion where the third vibration plate 53 and the piezoelectric layer 70 are provided to the first vibration plate 51 and the second vibration plate 52 and the portion where the third vibration plate 53 and the piezoelectric layer 70 are not provided thereto are provided in the +x direction in the flexible region P. In addition thereto, a portion where the third vibration plate 53 and the piezoelectric layer 70 are provided to the first vibration plate 51 and the second vibration plate 52 and a portion where the third vibration plate 53 and the piezoelectric layer 70 are not provided thereto may be provided in the +y direction in the flexible region P likewise, for example. In the printing head 1 of each of the Embodiments 1 and 2, the third vibration plate 53 and the piezoelectric layer 70 may be provided to the central portion without providing the third vibration plate 53 and the piezoelectric layer 70 to two end portions along the y axis, that is, an end portion in the +y direction and an end portion in the −y direction, for example. Regarding the printing head of the Embodiment 3, the third vibration plate 53 and the piezoelectric layer 70 may be provided to the end portion in the +y direction and the end portion in the −y direction without providing the third vibration plate 53 and the piezoelectric layer 70 to the central portion. Of course, the portions to provide or not to provide the third vibration plate 53 and the piezoelectric layer 70 in the direction along the y axis are not limited only to the foregoing.

Figure 10:
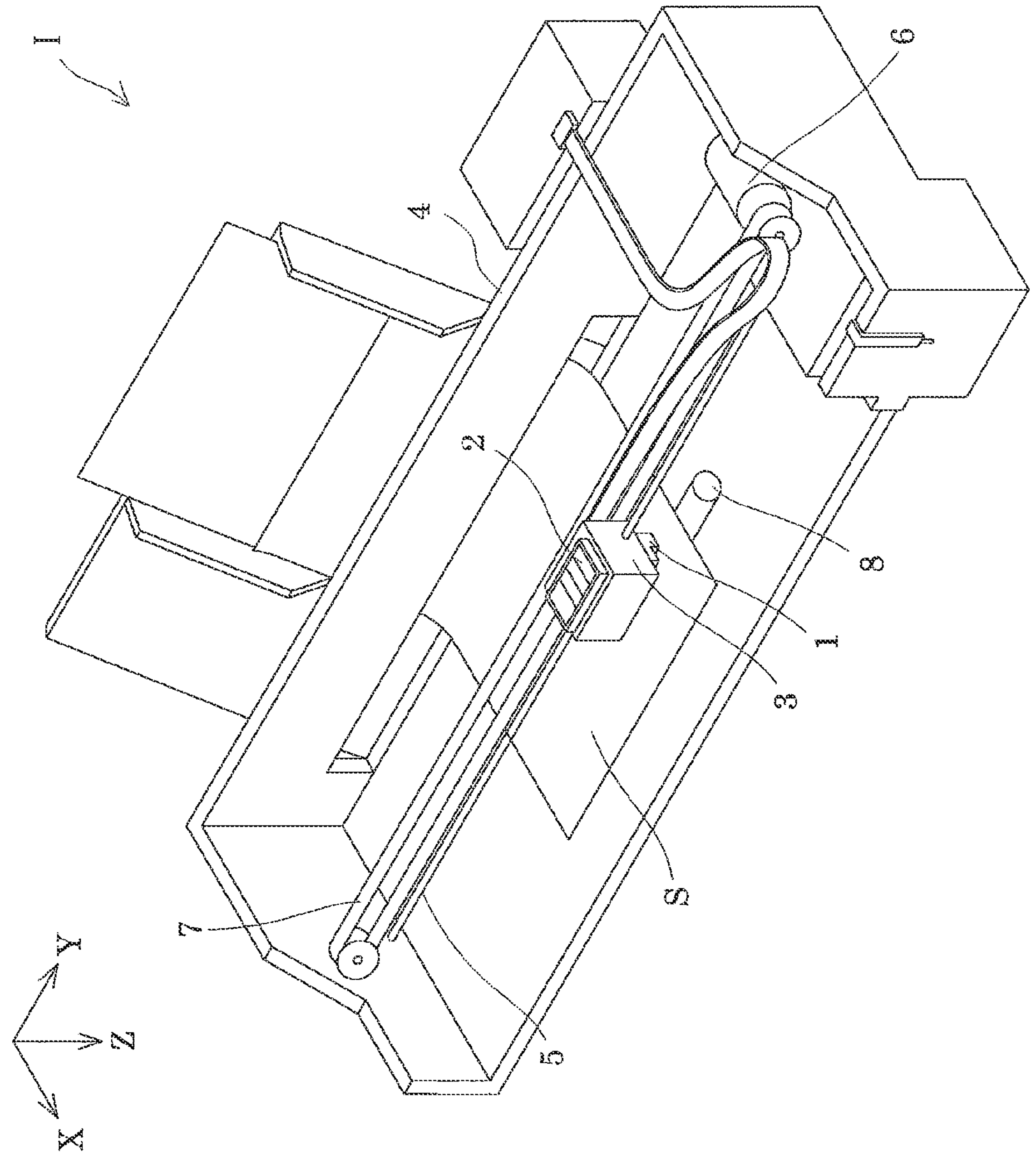
FIG. 10 is a diagram illustrating a schematic configuration of a printing apparatus according to one embodiment of the present disclosure.

In the meantime, the printing head 1 of each of these embodiments is mounted on an ink jet printing apparatus that represents an example of a liquid ejecting apparatus. FIG. 10 is a schematic diagram illustrating an example of an ink jet printing apparatus that represents an example of a liquid ejecting apparatus of one embodiment.

In an ink jet printing apparatus I illustrated in FIG. 10, cartridges 2 constituting an ink supply unit are attachably and detachably provided to the printing head 1, and the printing head 1 is mounted on a carriage 3. The carriage 3 mounting the printing head 1 is provided in such a way as to be movable in an axial direction of a carriage shaft 5 fitted to an apparatus body 4.

Drive force of a driving motor 6 is transmitted to the carriage 3 through not-illustrated gears and a timing belt 7, whereby the carriage 3 mounting the printing head 1 moves along the carriage shaft 5. The apparatus body 4 is provided with transportation rollers 8 serving as a transportation unit, and a print sheet S being a print medium such as paper is transported by the transportation rollers 8. Here, the transportation unit to transport the print sheet S is not limited only to the transportation rollers. The transportation unit may be a belt, a drum, and so forth.

The above-described ink jet printing apparatus I transports the print sheet S in the +x direction relative to the printing head 1, and ejects the ink droplets from the printing head 1 while reciprocating the carriage 3 in the y direction relative to the print sheet S. Thus, the ink jet printing apparatus I executes so-called printing such that the ink droplets from the printing head 1 are landed substantially on the entire surface of the print sheet S.

The above-described ink jet printing apparatus I depicts the example in which the printing head 1 is mounted on the carriage 3 and subjected to reciprocation in the y direction being a main scanning direction. However, the ink jet printing apparatus is not limited only to this configuration. For example, the present disclosure is also applicable to a so-called line-type printing apparatus, which is configured to perform printing merely by moving the print sheet S such as paper in the x direction being a vertical scanning direction while fixing the printing head 1.

The above-described embodiments have explained the ink jet printing head as an example of the liquid ejecting head and the ink jet printing apparatus as an example of the liquid ejecting apparatus. However, the present disclosure is targeted for broad ranges of liquid ejecting heads and liquid ejecting apparatuses in general. In this regard, the present disclosure is naturally applicable to liquid ejecting heads and liquid ejecting apparatuses configured to eject liquids other than inks. Examples of other liquid ejecting heads include various printing heads used for image printing apparatuses such as printers, a coloring material ejecting head used for manufacturing color filters for liquid crystal display units and the like, an electrode material ejecting head used for forming electrodes for organic EL display units and field emission display (FED) units, a bioorganic substance ejecting head used for manufacturing biochips, and the like. The present disclosure is also applicable to the liquid ejecting apparatus including this liquid ejecting head.

What is claimed is:

1. A liquid ejecting head comprising:

a pressure chamber;

a vibration plate including a first vibration plate, a second vibration plate, and a third vibration plate; and a piezoelectric actuator including a first electrode, a piezoelectric layer, and a second electrode being stacked in this order, wherein a plurality of the pressure chambers are arranged in a first direction in plan view from a stacking direction of the vibration plate and the piezoelectric actuator, a first portion where the piezoelectric layer and the third vibration plate are stacked on the first vibration plate and the second vibration plate, and a second portion where the piezoelectric layer and the third vibration plate are not stacked on the first vibration plate and the second vibration plate are provided in the first direction, one of the first vibration plate and the second vibration plate has a compressive stress and another one of the first vibration plate and the second vibration plate has a tensile stress, and a Young's modulus of the third vibration plate is larger than Young's moduli of the first vibration plate and the second vibration plate.

2. The liquid ejecting head according to claim 1, wherein the second portion where the piezoelectric layer and the third vibration plate are not stacked is a portion corresponding to two end portions in the first direction of the pressure chamber.

3. The liquid ejecting head according to claim 1, wherein the second portion where the piezoelectric layer and the third vibration plate are not stacked is a portion corresponding to a center in the first direction of the pressure chamber.

4. The liquid ejecting head according to claim 1, wherein the first vibration plate is formed from a thermally oxidized film, a partition wall partitioning the plurality of the pressure chambers is formed from single crystalline silicon, and the first vibration plate is in contact with the partition wall.

5. The liquid ejecting head according to claim 1, wherein a flow passage protection film is formed on an inner wall of the pressure chamber, and a Young's modulus of the flow passage protection film is smaller than the Young's modulus of the third vibration plate.

6. The liquid ejecting head according to claim 1, wherein the piezoelectric layer contains lead, the third vibration plate is formed from one of an oxide containing zirconium, a nitride containing silicon, and an oxynitride containing silicon, and at least one of the first vibration plate and the second vibration plate contains any of a silicon oxide and silicon.

7. The liquid ejecting head according to claim 1, wherein at least one of the first vibration plate and the second vibration plate is amorphous.

8. The liquid ejecting head according to claim 1, wherein the first vibration plate has a compressive stress, and the second vibration plate has a tensile stress.

9. The liquid ejecting head according to claim 8, wherein a thickness of the first vibration plate is larger than a thickness of the second vibration plate.

10. The liquid ejecting head according to claim 1, wherein the first vibration plate has a tensile stress, and the second vibration plate has a compressive stress.

11. The liquid ejecting head according to claim 10, wherein a thickness of the second vibration plate is larger than a thickness of the first vibration plate.

12. The liquid ejecting head according to claim 1, wherein at least one of the first vibration plate and the second vibration plate is reduced in thickness at the second portion where the piezoelectric layer and the third vibration plate are not stacked as compared to the first portion where the piezoelectric layer and the third vibration plate are stacked.

13. A liquid ejecting apparatus comprising:

the liquid ejecting head according to claim 1.

14. The liquid ejecting head according to claim 1, wherein the first vibration plate contains silicon oxide, and the second vibration plate contains silicon oxide.

15. A liquid ejecting head comprising:

a pressure chamber;

a vibration plate including a first vibration plate, a second vibration plate, and a third vibration plate; and a piezoelectric actuator including a first electrode, a piezoelectric layer, and a second electrode being stacked in this order, wherein a plurality of the pressure chambers are arranged in a first direction in plan view from a stacking direction of the vibration plate and the piezoelectric actuator, a portion where the piezoelectric layer and the third vibration plate are stacked in the first direction on the first vibration plate and the second vibration plate, and a portion where the piezoelectric layer and the third vibration plate are not stacked are provided, one of the first vibration plate and the second vibration plate has a compressive stress and another one of the first vibration plate and the second vibration plate has a tensile stress, a Young's modulus of the third vibration plate is larger than Young's moduli of the first vibration plate and the second vibration plate, and the portion where the piezoelectric layer and the third vibration plate are not stacked is a portion corresponding to a center in the first direction of the pressure chamber.

16. A liquid ejecting head comprising:

a pressure chamber;

a vibration plate including a first vibration plate, a second vibration plate, and a third vibration plate; and a piezoelectric actuator including a first electrode, a piezoelectric layer, and a second electrode being stacked in this order, wherein a plurality of the pressure chambers are arranged in a first direction in plan view from a stacking direction of the vibration plate and the piezoelectric actuator, a portion where the piezoelectric layer and the third vibration plate are stacked in the first direction on the first vibration plate and the second vibration plate, and a portion where the piezoelectric layer and the third vibration plate are not stacked are provided, one of the first vibration plate and the second vibration plate has a compressive stress and another one of the first vibration plate and the second vibration plate has a tensile stress, a Young's modulus of the third vibration plate is larger than Young's moduli of the first vibration plate and the second vibration plate, and at least one of the first vibration plate and the second vibration plate is reduced in thickness at the portion where the piezoelectric layer and the third vibration plate are not stacked as compared to the portion where the piezoelectric layer and the third vibration plate are stacked.

* * * * *